United States Patent [19]
Becerra

[11] Patent Number: 6,008,560
[45] Date of Patent: Dec. 28, 1999

[54] INVERTER DRIVEN MOTOR HAVING WINDING TERMINATION REDUCING EMI

[75] Inventor: Roger C. Becerra, Fort Wayne, Ind.

[73] Assignee: General Electric Company, Schenectady, N.Y.

[21] Appl. No.: 09/023,237

[22] Filed: Feb. 13, 1998

[51] Int. Cl.⁶ .............................. H02K 1/00; H02K 3/00
[52] U.S. Cl. ........................ 310/179; 310/71; 310/180; 310/184; 310/198; 310/200; 310/195
[58] Field of Search ................ 310/71, 179, 180, 310/181; 29/596, 598; 242/176, 175, 174, 360

[56] References Cited

U.S. PATENT DOCUMENTS

| | | | |
|---|---|---|---|
| 2,795,712 | 6/1957 | Suhr | 310/198 |
| 3,153,183 | 10/1964 | Brammerlo et al. | 318/224 |
| 3,577,053 | 5/1971 | McGee | 318/254 |
| 3,663,878 | 5/1972 | Miyasaka | 318/254 |
| 3,806,785 | 4/1974 | De Valroger et al. | 318/254 |
| 3,942,083 | 3/1976 | Takahashi et al. | 318/138 |
| 4,005,347 | 1/1977 | Erdman | 318/254 |
| 4,025,810 | 5/1977 | Field | 310/162 |
| 4,025,840 | 5/1977 | Brissey et al. | 322/52 |
| 4,152,630 | 5/1979 | Wanlass | 318/796 |
| 4,491,771 | 1/1985 | Kimura | 318/254 |
| 4,710,684 | 12/1987 | Okita et al. | 318/254 |
| 4,733,159 | 3/1988 | Edwards et al. | 323/282 |
| 4,737,674 | 4/1988 | Miyao | 310/268 |
| 4,752,707 | 6/1988 | Morrill | 310/184 |
| 4,782,272 | 11/1988 | Buckley et al. | 318/254 |
| 4,808,868 | 2/1989 | Roberts | 310/68 R |
| 4,959,596 | 9/1990 | MacMinn et al. | 318/254 |
| 5,194,775 | 3/1993 | Cooper | 310/260 |
| 5,483,136 | 1/1996 | Marcinkiewicz | 318/558 |
| 5,508,571 | 4/1996 | Shafer, Jr. | 310/71 |
| 5,592,058 | 1/1997 | Archer et al. | 318/254 |
| 5,610,486 | 3/1997 | Li | 318/439 |
| 5,646,498 | 7/1997 | Lipo et al. | 318/800 |

*Primary Examiner*—Elvin Enad
*Attorney, Agent, or Firm*—Senniger, Powers, Leavitt & Roedel; Damian Wasserbauer

[57] ABSTRACT

A motor with a switching power converter is connected to a power source for supplying power to the motor. The converter has a motor terminal selectively connected to a voltage bus. A stator core has a stator body supporting a plurality of poles. A rotor is in magnetic coupling relationship with the stator core. A stator winding has a first termination and a second termination and is wound on one of the poles such that the first termination is closer to the one pole than the second termination. The first termination is electrically connected to a neutral terminal. The second termination is electrically connected to the motor terminal of the switching power converter. Parasitic capacitance associated with the second termination and EMI caused by such parasitic capacitance is minimized as compared to the parasitic capacitance occurring if the second termination is connected to the neutral terminal and the first termination is connected to the motor terminal. A method of assembling is also described.

25 Claims, 9 Drawing Sheets

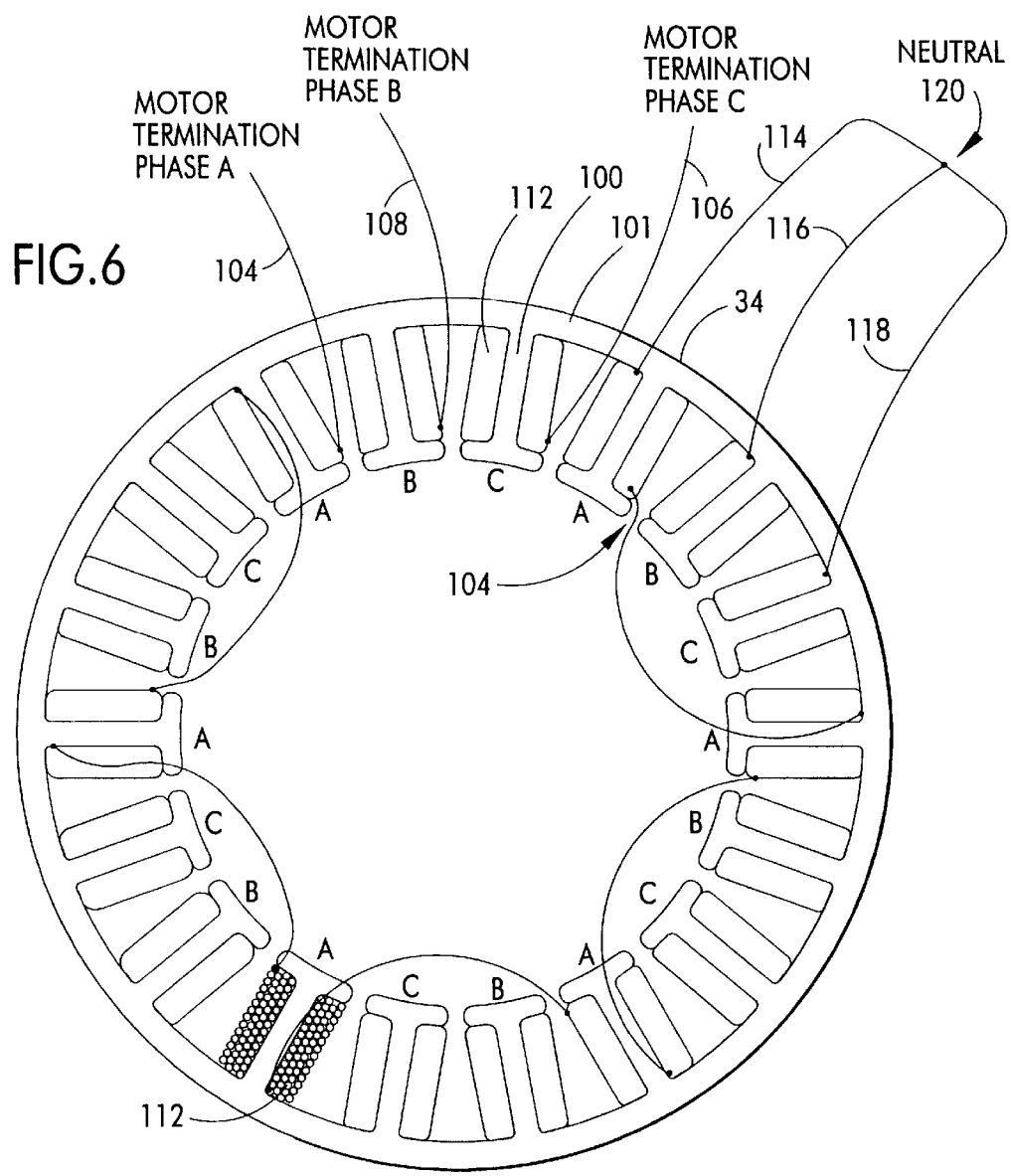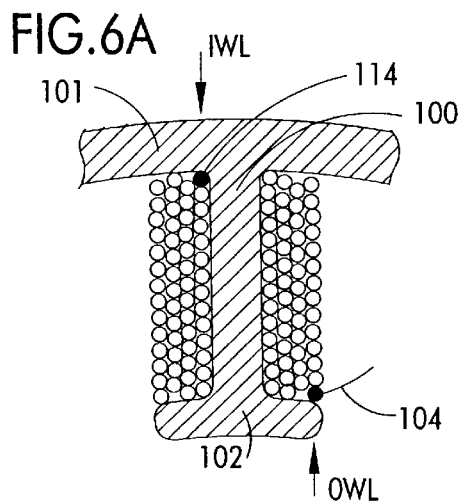

INVERTER DRIVEN MOTOR HAVING WINDING TERMINATION REDUCING EMI

FIELD OF THE INVENTION

The invention generally relates to motor construction and particularly relates to stator winding terminations which have decreased parasitic capacitances resulting in reduced electromagnetic interference.

BACKGROUND OF THE INVENTION

Electromagnetic interference ("EMI") is gen erated by a variety of sources such as electric field coupling, conductive coupling and common impedance coupling. These sources, in turn, generate two distinct types of interference. The first type of interference is known as conductive interference because it is conducted in power and ground lines. The second type of interference is considered radiated interference because it results in radiated electromagnetic energy waves. There is a need for design and manufacturing improvements that reduce conductive interference. In particular, there is a need to reduce conductive interference generated by electronically commutated motors which are widely used in a variety of applications such as, for example, household appliances. Often, such motors are commutated by switching power converters, the general operation of which is known in the art. Such switching power converters typically comprise a plurality of solid state power switching devices connected to the motor winding phases for selectively applying a voltage to the winding. Parasitic capacitances (sometimes referred to as "stray capacitances") are an unwanted yet virtually inevitable byproduct of the fact that electric circuits are constructed from non-ideal components. As defined in the IEEE STANDARD DICTIONARY OF ELECTRICAL AND ELECTRONIC TERMS (3d Ed.), parasitic capacitance (stray capacitance) occurs in varying degrees due to the "proximity of component parts, wires, and grounds." In general, the value of the parasitic capacitance increases inversely with the physical distance between the component parts, wires or grounds. In other words, as the distance between two conductors decreases, the parasitic capacitance between those two conductors tends to increase.

In switching power converters, parasitic capacitances exist between the switching elements and ground. Further parasitic capacitances exist between the connections to the motor winding and ground (typically the motor frame itself is tied to ground potential). These parasitic capacitances can result in the generation of conductive EMI. For example, the excitation of motor windings by high speed power switches in an inverter drive allows high frequency currents to flow through these parasitic capacitances to ground. The high frequency current components are the result of the fast switching rate. As is known in the art, current through a capacitor is reflected by the equation:

$$i = C dv/dt$$

where i represents current, C represents the magnitude of the capacitance, and dv/dt is the time rate of change in the applied voltage. As can be seen, higher switching rates and sharp changes in the applied voltage result in increased dv/dt, and thus, increased current flow i for a given value of capacitance C.

These circulating currents are known as "ground currents." One of the common techniques for reducing ground currents is to use EMI filters—typically a common mode choke and capacitors in series with the input power supply. Depending upon the particular application, several filter stages may be required to achieve the desired level of filtering. These filtering techniques, however, do not reduce the parasitic capacitances associated with the motor windings that actually cause the EMI. In other words, filters address the symptoms, not the source of the problem. Several approaches are known in the art for dealing with these parasitic capacitances. For example, the thickness and dielectric characteristics of the isolating material between the winding and stator may be altered to achieve the desired results. The drawbacks of this approach, aside from increased cost and complexity, are the risk of thermal degradation of the motor and possibly the motor controller itself.

There is a need, therefore, for a cost effective way to reduce conductive EMI in electronically commutated motors. In particular, there is a need to reduce the parasitic capacitances associated with motor windings without significantly impacting motor design or manufacturing costs.

SUMMARY OF THE INVENTION

It is therefore seen to be desirable to provide a low cost electronically commutated motor. Thus, there is a need for an electronically commutated motor having reduced conductive electromagnetic interference. There is also a need for an electronically commutated motor having reduced parasitic capacitance. There is also a need for an electronically commutated motor having reduced parasitic capacitance distributed along a stator winding. There is also a need for an electronically commutated motor having reduced ground currents.

There is also a need for a low cost method of assembling a motor in which the conductive electromagnetic interference is reduced. There is also a need for a method of assembling a motor in which parasitic capacitance distributed along a stator winding is reduced.

The invention comprises a motor with a switching power converter connected to a power source for supplying power to the motor. The converter has a motor terminal selectively connected to a voltage bus. A stator core has a stator body supporting a plurality of poles. A rotor is in magnetic coupling relationship with the stator core. A stator winding has a first termination and a second termination and is wound on one of the poles such that the first termination is closer to the one pole than the second termination. The first termination is electrically connected to a neutral terminal. The second termination is electrically connected to the motor terminal of the switching power converter. Parasitic capacitance associated with the second termination and EMI caused by such parasitic capacitance is minimized as compared to the parasitic capacitance occurring if the second termination is connected to the neutral terminal and the first termination is connected to the motor terminal.

The invention also comprises a method of assembling a motor. The motor has a motor winding, a stator with poles, and a switching power converter with power switches between which a motor terminal is defined. The switching power converter is adapted to be connected to a power source for supplying power to the motor. A rotor is in magnetic coupling relationship with the stator. The method comprises the steps of winding the motor winding on one of the poles of the stator so that one end of the winding is separated from the pole by one or more layers of the winding and connecting the one end of the winding to the motor terminal of the switching power converter and connecting the other end of the winding to a neutral terminal to minimize parasitic capacitance from the end of the winding and to minimize EMI caused by such parasitic capacitance.

The invention also comprises a motor comprising a switching power converter adapted to be connected to a power source for supplying power to the motor. The converter has a motor terminal selectively connected to a voltage bus. A stator core has a stator body supporting a plurality of poles. A rotor is in magnetic coupling relationship with the stator core. A stator winding has a plurality of layers wound on one of the poles. A first winding layer is positioned closer to the pole than a second winding layer. The first winding layer has a first termination electrically connected to a neutral terminal. The second winding layer has a second termination electrically connected to the motor terminal. Whereby a ground current associated with the second termination and EMI caused by such ground current is reduced as compared to the ground current occurring if the second termination is connected to the neutral terminal and the first termination is connected to the motor terminal.

The invention also comprises a method of assembling a motor comprising a motor winding, a stator with poles and a switching power converter that has power switches between which a motor terminal is defined. The switching power converted is adapted to be connected to a power source for supplying power to the motor. The method comprises the steps of winding the motor winding on one of the poles of the stator in layers so that one end of the winding is separated from the pole by one or more layers of winding. Connecting the end of the winding to the motor terminal of the switching power converter to minimize ground currents associated with the end of the winding and minimizing the EMI caused by such ground currents.

BRIEF DESCRIPTION OF THE DRAWINGS

FIG. 6 is a top view of a cross sectional illustration of a three phase salient pole motor according to a preferred embodiment of the invention, having 18 stator poles with the neutral termination positioned adjacent the pole.

FIG. 6A is an exploded cross sectional view of a single pole according to the preferred embodiment of the invention shown in FIG. 6.

DETAILED DESCRIPTION OF PREFERRED EMBODIMENTS

Figure 1:
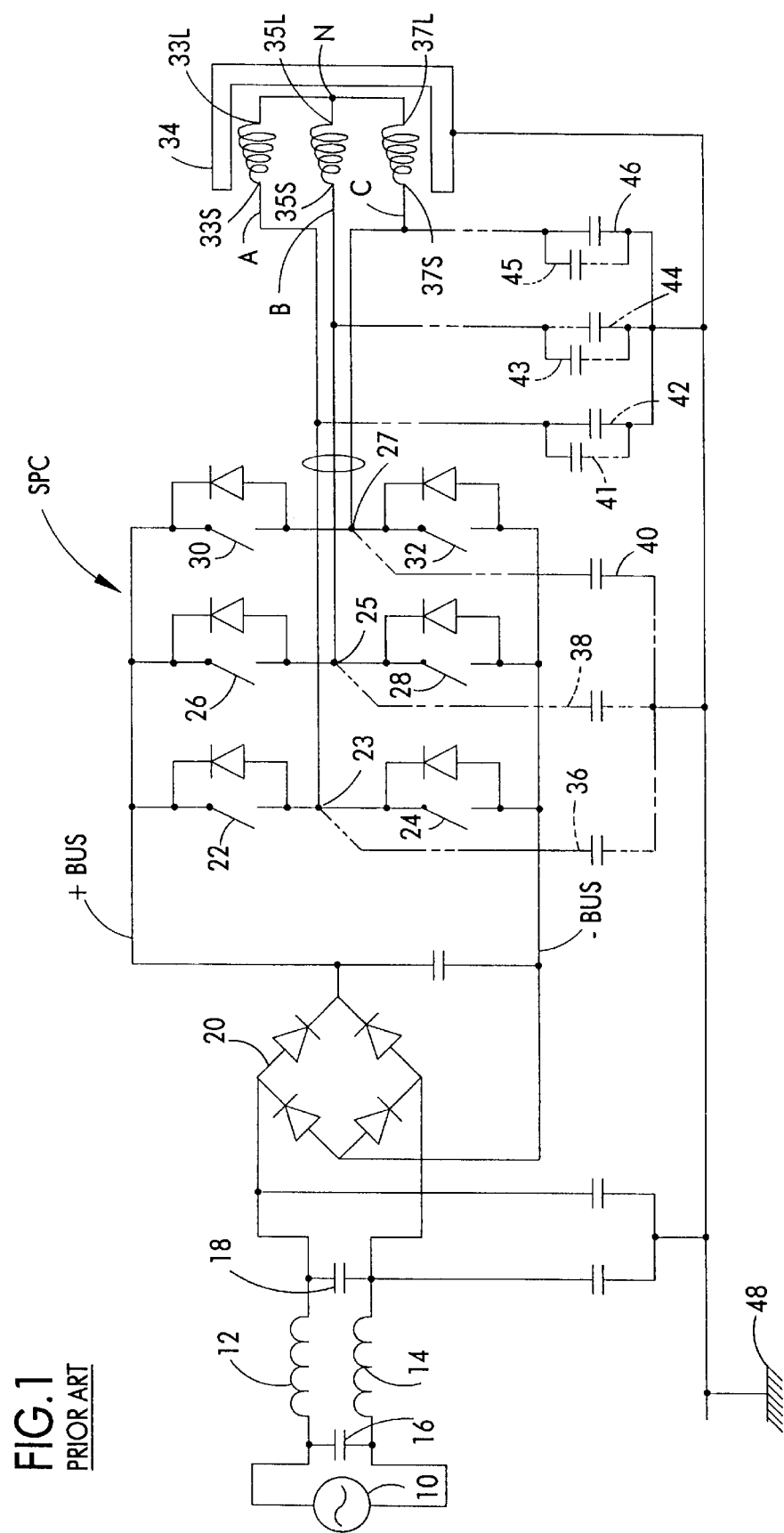
FIG. 1 is a schematic diagram, including parasitic apacitances, of a motor of the prior art having an inverter for powering a motor winding.

FIG. 1 is a schematic diagram of a prior art electronically commutated motor having a switching power converter SPC for supplying power to the motor. The SPC includes an input power source 10 and an EMI input filter comprising serial inductors 12, 14 and parallel capacitors 16, 18. The filtered input voltage is rectified by rectifier 20 to provide DC voltage rails +Bus and –Bus. Rectifier 20, as illustrated in FIG. 1, comprises a diode bridge. Power switches 22, 24, 26, 28, 30 and 32 constitute a switching power converter SPC as is known in the art. Switching power converters are commonly referred to by a variety of names, such as "inverter bridges" or "inverter drives." In the switching power converter SPC, the switches are selectively opened and closed by a commutation controller (not shown) to energize phases A, B and C of motor stator 34. The phases are selectively energized in a sequence such that a rotating magnetic field is established in the stator thereby causing a motor rotor to rotate. The power switches are typically solid state devices, often either IGBTs or MOSFETs.

In the SPC shown in FIG. 1, the power switches are configured in pairs corresponding to the motor phases, each pair having a motor terminal at the junction therebetween. For example, the phase A winding is connected to phase A motor terminal 23 between phase A power switches 22 and 24. Phase B is connected to phase B motor terminal 25 between phase B power switches 26 and 28. Likewise, phase C is connected to phase C motor terminal 27 between phase C power switches 30 and 32.

Parasitic capacitances distributed along the stator windings are represented in FIG. 1 as capacitors 41, 42, 43, 44, 45 and 46. It is important to note that these parasitic capacitances do not represent physical devices installed in the motor drive, hence these capacitors are shown in phantom. As was discussed above, parasitic capacitances reflect unwanted capacitances that occur naturally in most circuits. Parasitic capacitance, if large enough, can adversely affect circuit performance, and is, therefore, undesirable. In particular, parasitic capacitances 41, 42, 43, 44, 45 and 46 provide paths for currents to circulate in ground loops. Such currents may be generated, for example, due to high switching rates which in turn cause a fast rate of change in the voltage developed at motor terminals 23, 25 and 27. The resulting ground currents contribute to EMI. Further, parasitic capacitances 41, 42, 43, 44, 45 and 46 are drawn in parallel pairs to emphasize the relatively high value of such capacitances in prior art motors constructed as illustrated in FIG. 1.

The parasitic capacitances due to the power switches are illustrated in FIG. 1 as capacitors 36, 38 and 40. Like the parasitic capacitances associated with the stator windings, these capacitances do not represent physical devices, but rather a physical phenomena, and are likewise shown in phantom. In practice, with switching power converters such as that depicted in FIG. 1 (SPC), only the lower power switches (e.g., switches 42, 44 and 46) contribute significantly to switching parasitic capacitance. This is due to the fact that the body on most solid-state power switches serves as the collector (in the case of an MOSFET) or drain (in the case of a IGBT). Power switches are often mounted on heatsinks to dissipate heat generated in the devices. In a typical switching power converter such as that shown in FIG. 1 (SPC), only the lower switch (e.g., switch 24 for phase A) has its collector (or drain if the device is a IGBT) connected to the motor terminal (e.g., motor terminal 23 for phase A). Hence, the contribution to the parasitic capacitance at a given motor terminal is primarily due to the lower switches 24, 28 and 32. Those skilled in the art will recognize that one way to reduce parasitic capacitance due to a power switch is to electrically isolate the power switch from the heatsink to which it is mounted.

The phase windings A, B and C are illustrated in FIG. 1 using a convention whereby the portions of each winding that are physically closest to the stator pole (e.g., the innermost layer of a multi-layer winding) are shown as smaller loops 33S, 35S and 37S, and the portions of each winding that are physically most remote from the stator pole (e.g., the outermost layer) are shown as larger loops 33L, 35L and 37L. In prior art motors, such as that shown in FIG. 1, the innermost winding layer (33S, 35S, 37S) of each phase is connected to motor terminals 23, 25 and 27 of the switching power converter SPC. The outermost layer (33L, 35L, 37L) is connected to a neutral connection N. This winding construction is due, in part, because it is convenient in that the end shield of the motor has an opening in which the connector wire passes through. Using phase A as an example, the innermost winding layer 33S is connected to motor terminal 23, and the outermost winding layer 33L is connected to neutral terminal N. Locating the motor terminal closer to stator body 34, as is done in the prior art, results in relatively higher parasitic capacitance. This is due to the close spatial proximity of the motor connection and stator body. As was discussed above, in general, the closer two components or conductors are placed to each other, the greater the parasitic capacitance that develops between those components or conductors. This relatively high parasitic capacitance results in a greater potential for undesirable larger ground currents and associated conductive EMI.

Figure 2:
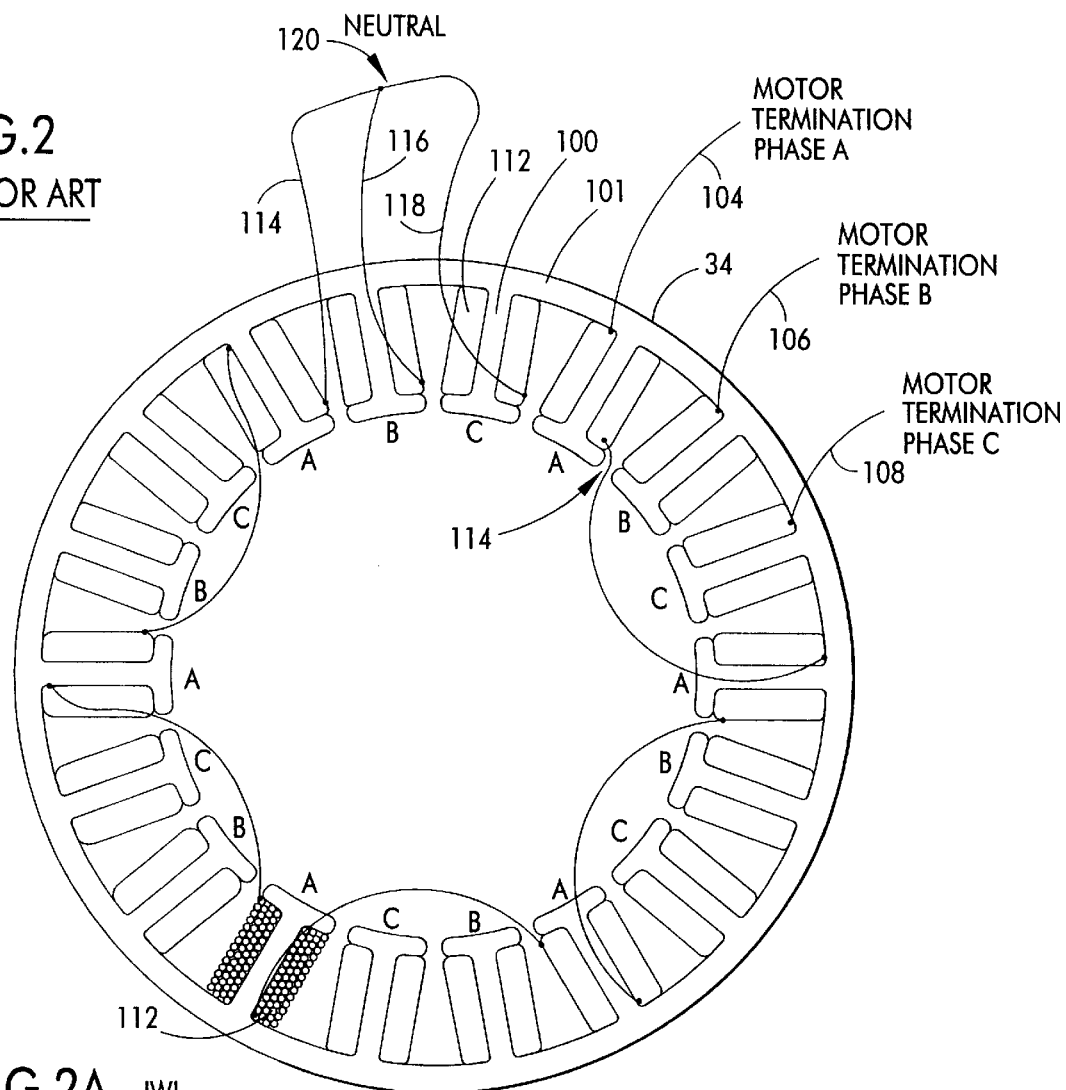
FIG. 2 is a top view of a cross sectional llustration of a prior art three phase salient pole motor having 18 stator poles with the motor termination positioned adjacent the pole.
Figure 2A:
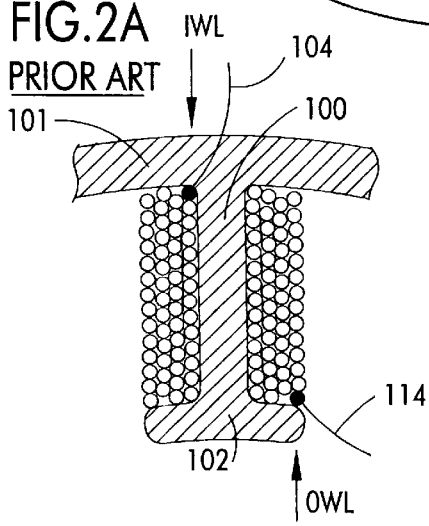
FIG. 2A is an exploded cross sectional view of a single pole of the prior art of FIG. 2.

FIGS. 2 and 2A illustrate a cross sectional view of a prior art winding structure that results in relatively higher parasitic capacitances. In FIGS. 2 and 2A, the motor terminations for each phase (104, 106, 108) are positioned at an innermost winding layer INL. In other words, the switching power converter (SPC) connection is made at the layer directly adjacent to a stator pole piece 100. The parasitic capacitance between the motor termination and the stator body is relatively large due to this closeness. The neutral terminations (114, 116, 118), on the other hand, are made at an outermost winding layer OWL. As stated above, the close spatial proximity of the motor termination to the stator body results in relatively higher parasitic capacitances, and, therefore, higher EMI.

Figure 3:
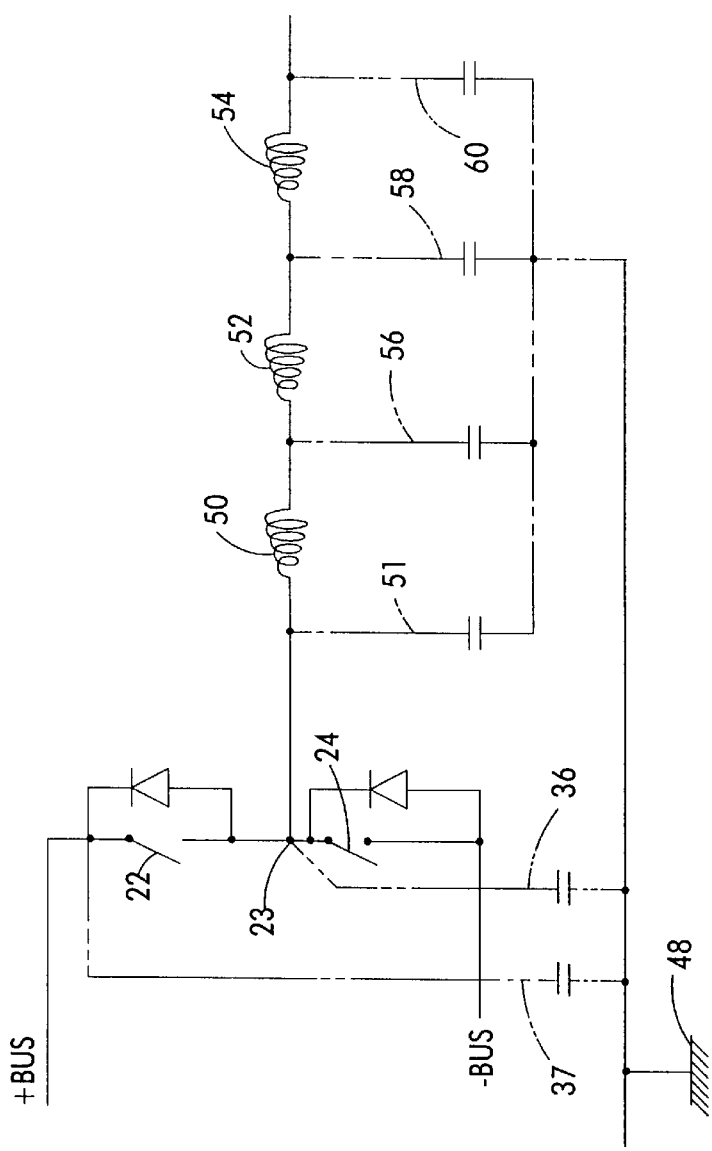
FIG. 3 is a schematic diagram of the prior art, including parasitic capacitances, of one phase of a motor having an inverter for powering a motor winding.

FIG. 3 illustrates the parasitic capacitance problem more clearly with regard to a single phase (e.g., phase A) of a prior art three phase motor. In FIG. 3, phase A power switches 22 and 24 are connected across the DC power rails +Bus and −Bus. When switch 22 is closed, the voltage on +Bus is applied at phase A motor terminal 23, which in turn energizes phase A. Phase A, for example, may consist of multiple poles, each pole having a plurality of winding layers. The windings around each pole in a particular phase may then be connected, or "daisy chained," together. Parasitic capacitances are distributed along the winding layers of a pole. FIG. 3 shows a representation of the parasitic capacitance as capacitors 51, 56, 58, and inductors 50, 52, 54. Inductors 50, 52, 54 are elements of the inductor of one winding pole. The parasitic capacitances present at each of these poles are illustrated as capacitors 56, 58 and 60 respectively. Parasitic capacitances 56, 58 and 60 are shown in phantom because they do no represent physical devices, but rather physical phenomena. These parasitic capacitances allow undesirable electrical coupling between the winding and the stator body which results in ground currents. As can be seen, therefore, if these parasitic capacitances are reduced, ground currents are likewise reduced. Hence, an overall reduction in EMI may be realized.

Figure 4:
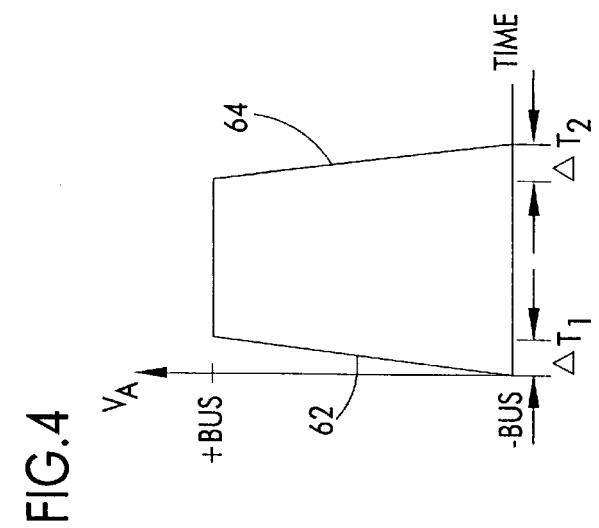
FIG. 4 is a typical timing waveform for the voltage supplied to one phase of a motor of the invention as embodied in FIG. 3.

The motor of FIG. 3 is commutated by alternatively opening and closing phase A power switches 22 and 24. This causes the voltage waveform of FIG. 4 to appear at phase A motor terminal 23. As is known in the art, sharp rises 62 or sharp falls 64 in an applied voltage allow high frequency currents to flow through capacitors due to the familiar relationship:

$$i = C\,dv/dt$$

where i represents current, C represents the capacitance, and dv/dt reflects the change in voltage per unit of time. Hence, when the voltage applied to phase A motor terminal 23 changes rapidly, the magnitude of the current flow due to the parasitic capacitance increases. This results in ground loops, increased losses and increased EMI. In order to reduce these undesirable effects one can decrease the switching rate or reduce the parasitic capacitance. The present invention advantageously reduces the parasitic capacitance due to the winding and thereby reduces the overall ground currents and associated EMI.

Figure 5:
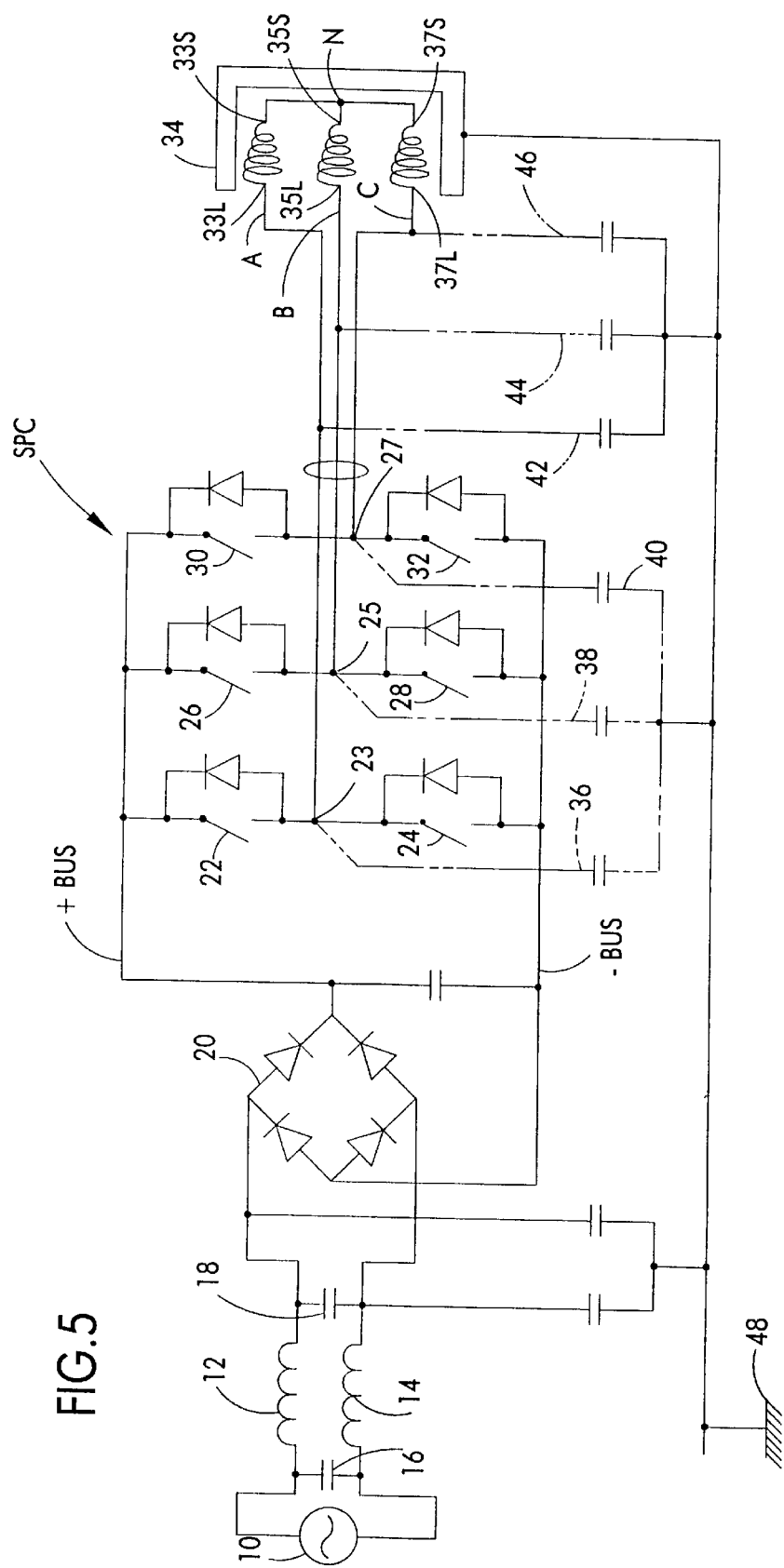
FIG. 5 is a schematic diagram of a preferred embodiment of a motor of the invention having an inverter for powering a motor winding, including parasitic capacitances.

Referring now to FIG. 5, a schematic diagram of one preferred embodiment of an electronically commutated motor of the present invention is shown. The general theory of operation of this motor is similar to that of the prior art motor of FIG. 1, therefore, common reference characters are use where applicable.

A switching power converter SPC supplies power to the motor. The SPC includes an input power source 10 and an EMI input filter comprising serial inductors 12, 14 and parallel capacitors 16, 18. The filtered input voltage is rectified by rectifier 20 to provide DC voltage rails +Bus and −Bus. Rectifier 20 is shown in FIG. 5 as a diode bridge. The switching power converter SPC comprises power switches 22, 24, 26, 28, 30 and 32. The switches are selectively opened and closed by a commutation controller (not shown) to energize phases A, B and C of motor stator 34. The phases are selectively energized in a sequence such that a rotating magnetic field is established in the stator thereby causing a motor rotor to rotate. As stated above with regard to FIG. 1, the power switches are often solid state devices, such as, for example, MOSFETs or IGBTs. U.S. Pat. No. 5,592,058, Control System and Methods for a Multiparameter Electronically Commutated Motor, the entire disclosure of which is hereby incorporated by reference, provides a description of a motor controller. For other examples of motor controllers, see U.S. Pat. No. 4,015,182, Refrigeration System and Control Therefor; U.S. Pat. No. 4,390,826, Laundering Apparatus, Method of Operating a Laundry Machine, Control System for an Electronically Commutated Motor, Method of Operating an Electronically Commutated Motor, and Circuit; U.S. Pat. No. 4,500,821, Speed or Torque Control Circuit for an Electronically Commutated Motor (ECM) and Method of Controlling the Torque or Speed of an ECM.

As was the case with the prior art motor illustrated in FIG. 1, in the preferred embodiment depicted in FIG. 5, the power switches are typically configured in pairs corresponding to the motor phases, each pair having a motor terminal at the junction therebetween. For example, the phase A winding is connected to phase A motor terminal 23 between phase A power switches 22 and 24. Phase B is connected to phase B motor terminal 25 between phase B power switches 26 and 28. Likewise, phase C is connected to phase C motor terminal 27 between phase C power switches 30 and 32.

In FIG. 5, parasitic capacitances associated with the stator windings are illustrated as capacitors 42, 44 and 46. In contrast with FIG. 1 above, only three such parasitic capacitances are shown in FIG. 5 to reflect the relatively low value of such capacitance in motors that employ the present invention. FIG. 5 also employs the convention whereby the innermost winding layers are shown as smaller loops 33S, 35S and 37S. The portions of each winding that are physically most remote from the stator pole are shown as larger loops 33L, 35L and 37L. As was discussed above, an increase in the distance between the stator 34 and the motor connections 23, 25 and 27, results in a relative decrease in parasitic capacitance effects.

The switching power converter SPC of FIG. 5 is connected to motor phases A, B and C. In the motor of the present invention, however, it is the outermost layer (33L, 35L, 37L) of each phase that is connected to the motor terminal. The innermost winding layer (33S, 35S, 37S) of each phase is connected to the neutral terminal N. For example, phase A is connected to phase A motor terminal 23 at 33L, and phase A is connected to neutral N at 33S. Phase B is connected to phase B motor terminal at 35L, and to neutral N at 35S. Likewise, phase C is connected to phase C motor terminal 27 at 37L, and to neutral N at 37S. In this way, the motor termination of each winding is maintained at the greatest practicable distance from the stator body 34. Therefore, the parasitic capacitances 42, 44, 46 associated with each phase are reduced thereby reducing EMI and improving motor operation. In other words, the parasitic capacitance is relatively lower than the parasitic capacitance that would occur if the connections were opposite as shown in the prior art motor of FIG. 1 above.

FIG. 6 is a top cross sectional view of a three phase salient pole stator according to a preferred embodiment of a motor of the present invention. As can be seen, the motor terminations of each phase (104, 106, 108) are positioned on the outermost winding layer IWL. In contrast, the neutral terminations (114, 116, 118) are positioned on the innermost winding layer OWL. The parasitic capacitance at the motor termination is effectively reduced due to the increased distance between the motor termination and the stator pole 100. FIG. 6A is an exploded cross sectional view of a single pole piece of the present invention.

A comparison of FIGS. 2 and 6, by way of example, illustrates how parasitic capacitances distributed along a motor winding may be accounted for and reduced in motor construction/manufacture. Both figures depict a salient pole stator 34 having eighteen poles and three phases A, B and C; each phase, in turn, having six poles per phase. In this example, each pole comprises a radial member 100 that extends from the stator body 101, and a transverse member 102 that is positioned substantially perpendicular to the radial member 100. Transverse member 102 may or may not be constructed from the same material as radial member 100 or stator body 101. Preferably, each lamination is a single, integral steel lamination which is stacked with other laminations. In FIGS. 2, 2A, 6 & 6A, transverse member 102 is shown as being constructed from the same material as radial member 100. Stator body 101 and radial member 100 are typically constructed from laminated steel layers. A winding 112, consisting of multiple layers, is wound around each stator pole. Each phase further comprises a neutral termination (114, 116, 118) and a motor termination (104, 106, 108). The motor termination for a given phase is connected to the motor terminal between the power switches associated with that particular phase. For example, phase A motor termination 104 would be connected to motor terminal 23 in FIG. 5; phase B motor termination 106 would be connected to motor terminal 25; and phase C motor termination 108 would be connected to motor terminal 27. The neutral terminations of these phases 114, 116, 118 are tied together to form motor neutral 120 (reference character N in FIG. 5).

As noted above, FIG. 2 depicts a winding structure that results in relatively higher parasitic capacitances than does the winding structure of FIG. 6. In FIG. 2, the motor terminations for each phase (104, 106, 108) are positioned at an innermost winding layer. In other words, the switching power converter SPC connection is made at the layer directly adjacent to a stator pole piece 100. The parasitic capacitance between the motor termination and the stator body is, therefore, relatively large due to this close spatial proximity. The neutral terminations (114, 116, 118) are made at an outermost winding layer.

By contrast, in FIG. 6 the motor terminations (104, 106, 108) are positioned at the outermost winding layer and the neutral terminations (114, 116, 118) are located at the innermost winding layer. By increasing the distance between the motor termination and the stator pole piece 100, the parasitic capacitance therebetween is decreased. As was shown above, a decrease in parasitic capacitance results in a decrease in ground currents, and therefore, a decrease in overall EMI.

Figure 7:
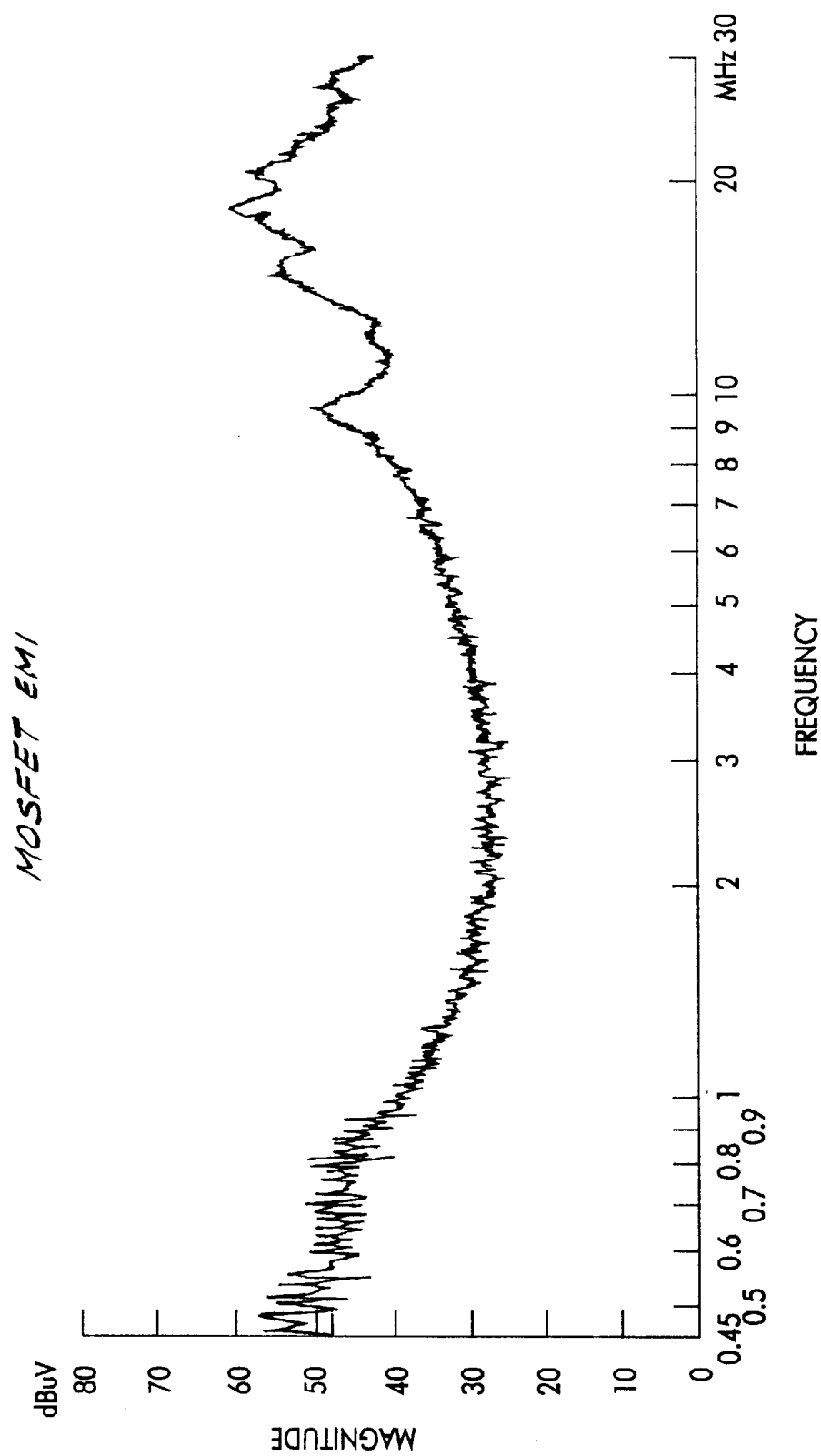
FIG. 7 is a graph illustrating magnitude in decibel microvolts (dB$\mu$V) along the vertical Y-axis and frequency in megahertz (MHz) along the horizontal X-axis of electromagnetic interference (EMI) from a prior art motor of the type illustrated in FIGS. 1 and 2 driven by a switching power converter including MOSFETs.
Figure 8:
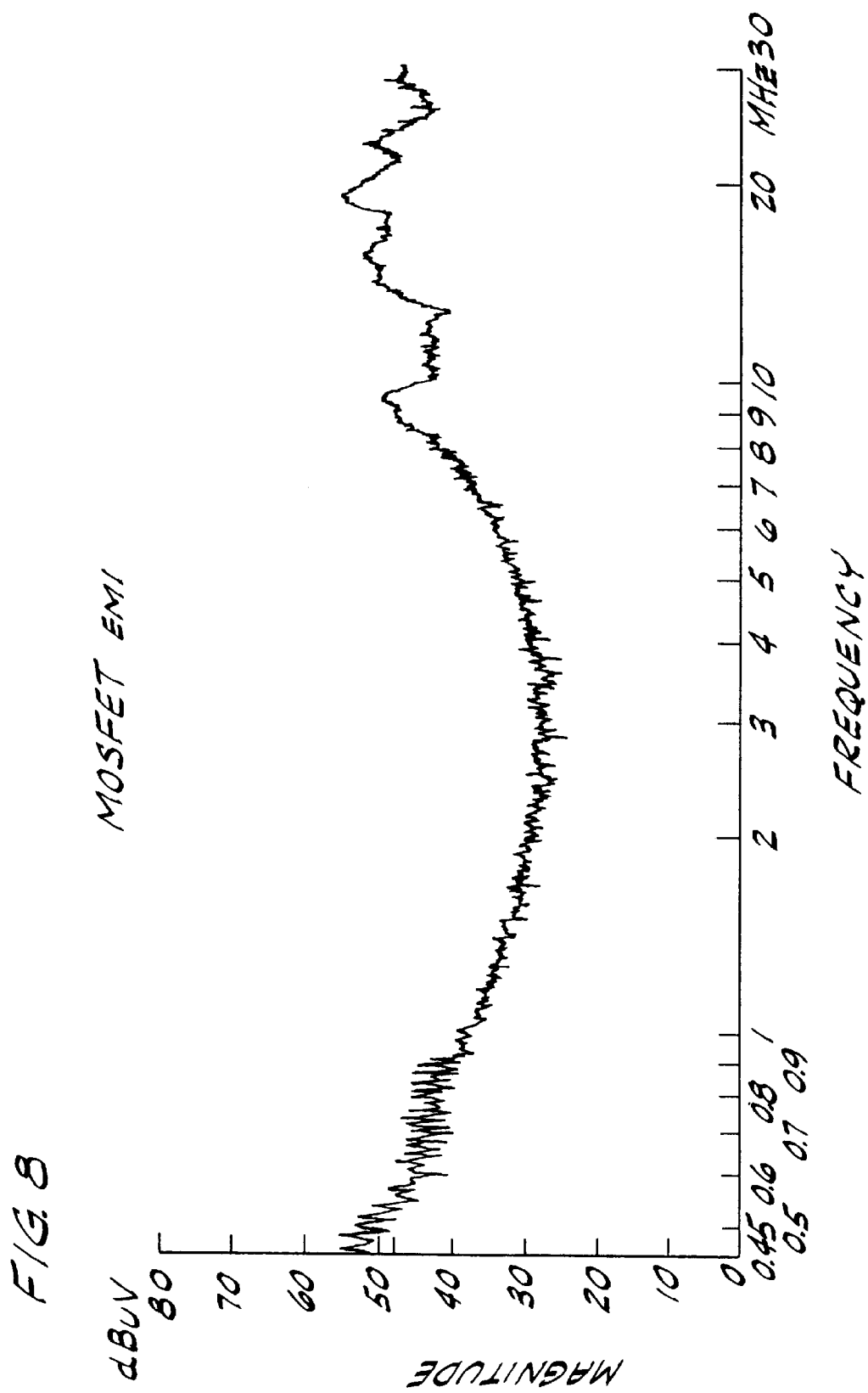
FIG. 8 is a graph illustrating magnitude in decibel microvolts (DB$\mu$V) along the vertical Y-axis and frequency in megahertz (MHz) along the horizontal X-axis of electromagnetic interference (EMI) from a motor according to the invention of the type illustrated in FIGS. 5 and 6 driven by a switching power converter including MOSFETs.

FIGS. 7 through 10 illustrate the advantages of the present invention with regard to decreasing EMI. FIG. 7 shows the EMI spectrum of a ½ horsepower motor using the prior art motor construction of FIG. 1, in which the power switches are MOSFETs. The prior art winding structure employed is essentially that of FIG. 2. FIG. 8, on the other hand, depicts the EMI spectrum of a motor of the present invention, as embodied in FIG. 5. A key difference is that it uses the winding structure of the present invention as shown, for example, in FIG. 6. As can be seen by comparing FIG. 7 to FIG. 8, the EMI spectrum in FIG. 8 is improved (reduced) at higher frequencies. This is due to the relative reduction in parasitic capacitance effects at the motor termination. In the particular embodiment tested, the parasitic capacitances distributed along the motor winding were approximately 100 picofarads per stator pole. As those skilled in the art will realize, the magnitude of the improvement in performance will vary with a given motor construction. In other words, the magnitude of the parasitic capacitance in any given motor design will impact both the magnitude of EMI improvement, as well as the frequency range in which the improvement is attained. In FIG. 8, for example, the EMI improvement is most noticeable at frequencies greater than 9 MHz.

Figure 9:
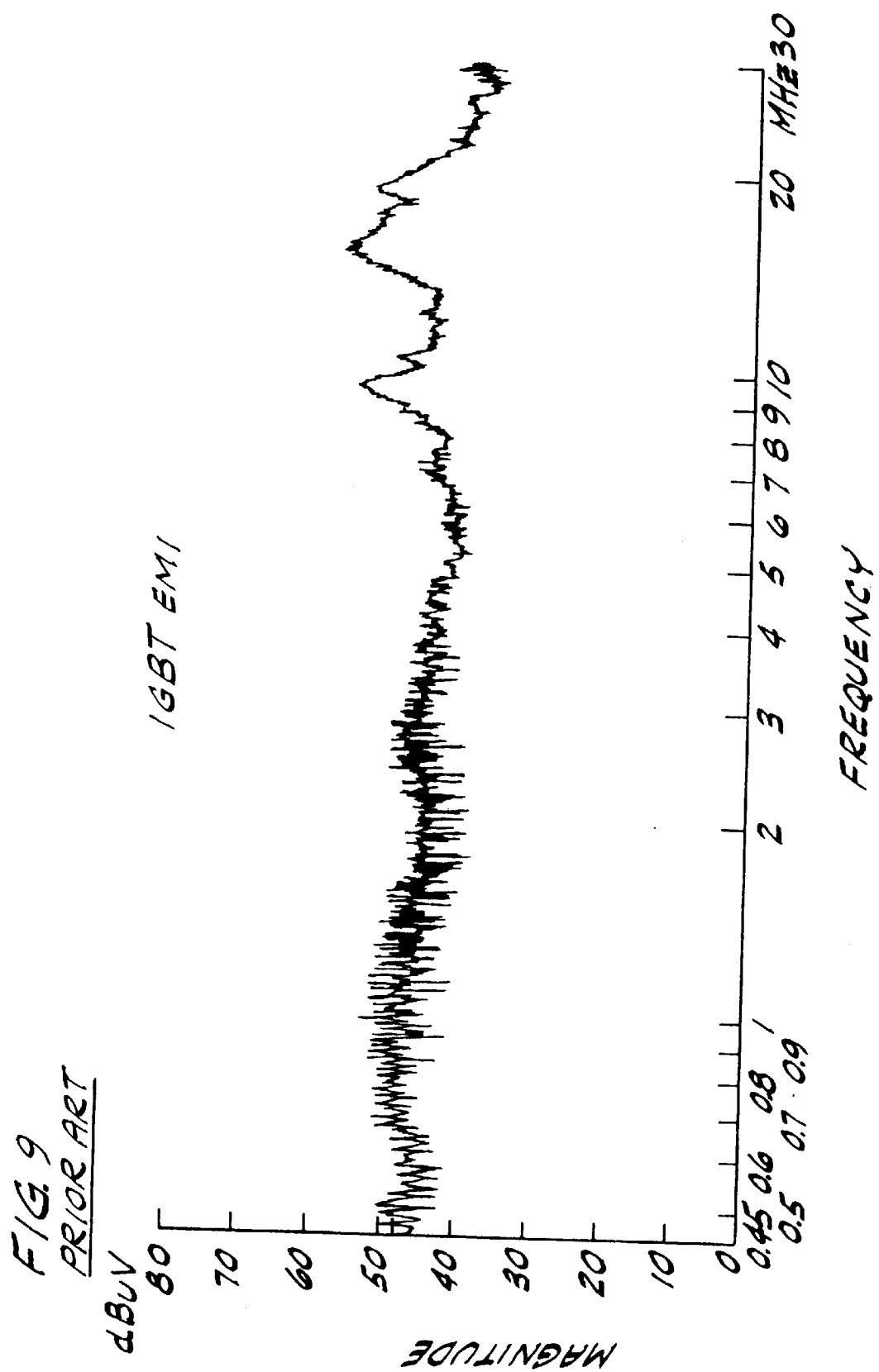
FIG. 9 is a graph illustrating magnitude in decibel microvolts (DB$\mu$V) along the vertical Y-axis and frequency in megahertz (MHz) along the horizontal X-axis of electromagnetic interference (EMI) from a prior art motor of the type illustrated in FIG. 1 and 2 driven by a switching power converter including IGBTs.
Figure 10:
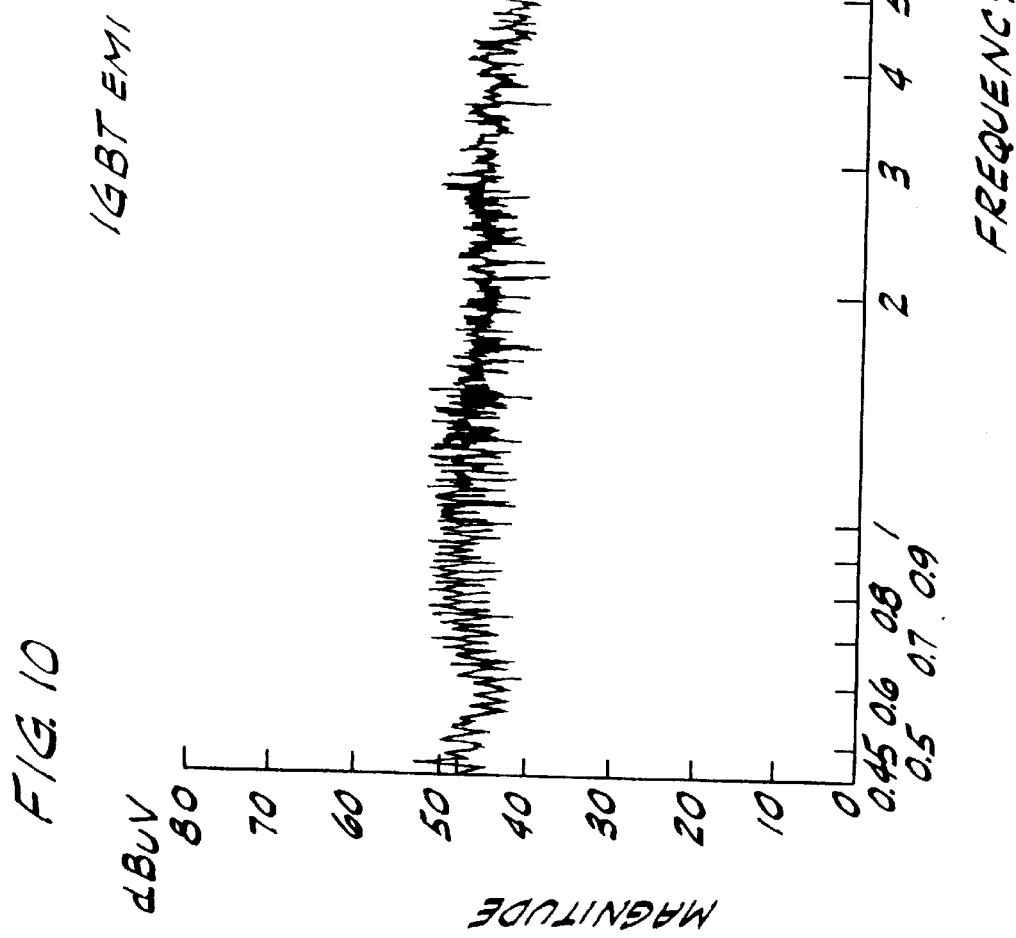
FIG. 10 is a graph illustrating magnitude in decibel microvolts (DB$\mu$V) along the vertical Y-axis and frequency in megahertz (MHz) along the horizontal X-axis of electromagnetic interference (EMI) from a motor according to the invention of the type illustrated in FIGS. 5 and 6 driven by a switching power converter including IGBTs.

FIGS. 9 and 10 depict comparable EMI spectra for similar motors using IGBT power switches rather than MOSFETs. FIG. 9 illustrates the spectrum for a salient pole motor having the prior art winding construction of FIG. 2. FIG. 10, on the other hand, depicts the EMI spectrum for a salient pole motor having a winding construction of the present invention as shown, for example, in FIG. 6. A comparison of FIGS. 9 and 10 reveals an overall improvement in the EMI spectrum at frequencies greater than 9 MHz in the motor of the present invention.

As various changes could be made in the above constructions and methods without departing from the scope of the invention, it is intended that all matter contained in the above description and shown in the accompanying drawings shall be interpreted as illustrative only, and not in a limiting sense.

What is claimed is:

1. A motor comprising:
    a switching power converter adapted to be connected to a power source for supplying power to the motor, said converter having a motor terminal selectively connected to a voltage bus;
    a stator core having a stator body and a plurality of poles, each said pole having a radial member supported by the stator body;
    a rotor in magnetic coupling relationship with the stator core;
    a stator winding having a first termination and a second termination, said stator winding wound on at least a selected one of the radial members of the poles such that a distance between the first termination and the selected radial member is less than a distance between the second termination and the selected radial member, said first termination electrically connected to a neutral terminal and said second termination electrically connected to the motor terminal of the switching power converter whereby the first termination is closer to the radial member than the second termination so that parasitic capacitance associated with the second termination and EMI caused by such parasitic capacitance is minimized as compared to the parasitic capacitance occurring if the second termination is connected to the neutral terminal and the first termination is; connected to the motor terminal.

2. The motor of claim 1 wherein the switching power converter comprises at least one solid-state switch.

3. The motor of claim 2 wherein the at least one solid-state switch comprises a IGBT.

4. The motor of claim 2 wherein the at least one solid-state switch comprises an MOSFET.

5. The motor of claim 1 wherein said rotor has an axis of rotation and wherein each pole of the stator core comprises a radial member extending radially from the stator body relative to the axis of rotation of the rotor, each said pole further having a transverse member being positioned substantially perpendicular to the radial member.

6. The motor of claim 5 wherein the stator body, radial member, and transverse member define a winding space, the stator winding being wound around the radial member in the winding space and wherein the stator winding comprises a salient pole winding.

7. The motor of claim 5 wherein the first termination is positioned substantially in an intersection of the radial member and the stator body whereby the first termination is closer to the radial member than the second.

8. The motor of claim 1 wherein the stator winding and the switching power converter comprise a multiphase motor.

9. The motor of claim 1 wherein a distance between the first termination and the second termination defines the width of the stator winding, said width being such that EMI is reduced at frequencies greater than 9 MHz.

10. A method of assembling a motor having a motor winding, a stator core having a stator body and a plurality of poles, each said pole having a radial member supported by the stator body, a switching power converter having power switches between which a motor terminal is defined, said switching power converter adapted to be connected to a power source for supplying power to the motor, and a rotor in magnetic coupling relationship with the stator core, said method comprising the steps of:
    winding the motor winding on at least a selected one of the radial members of the poles of the stator so that a distance between one end of the winding and the selected radial member is less than a distance between the other end of the winding and the selected radial member, said winding being wound around the radial member of each pole such that the other end is positioned substantially in an intersection of the radial member and the stator body; and
    connecting the one end of the winding to the motor terminal of the switching power converter and connecting the other end of the winding to a neutral terminal to minimize parasitic capacitance from the other end of the winding and to minimize EMI caused by such parasitic capacitance whereby the other end is closer to the radial member than the one end.

11. The method of claim 10 wherein the power switches comprise IGBT switches.

12. The method of claim 10 wherein the power switches comprise MOSFET switches.

13. The method of claim 10 wherein said rotor has an axis of rotation and wherein the stator comprises a stator body supporting the poles, wherein the radial member of each pole extends radially from the stator body relative to the axis of rotation of the rotor, each said pole further having a transverse member being positioned substantially perpendicular to the radial member.

14. The method of claim 13 wherein the stator body, radial member, and transverse member define a winding space, the motor winding being wound around the radial member in the winding space and wherein the motor winding comprises a salient pole winding.

15. The method of claim 10 wherein the motor winding and the switching power converter comprise a multiphase motor.

16. The method of claim 10 wherein the one or more layers of the winding comprise an innermost layer and an outermost layer, and wherein a distance between the innermost layer and the outermost layer defines the width of the motor winding, said width being such that EMI is reduced at frequencies greater than 9 MHz.

17. A motor comprising:
    a switching power converter adapted to be connected to a power source for supplying power to the motor, said converter having a motor terminal selectively connected to a voltage bus;
    a stator core having a stator body and a plurality of poles, each said pole having a radial member supported by the stator body;
    a rotor in magnetic coupling relationship with the stator core;
    a stator winding having a plurality of layers wound on a selected one of the radial members such that a first winding layer of the winding on the selected radial member is positioned closer to the selected radial member than a second winding layer of the winding on the selected radial member;

the first winding layer having a first termination electrically connected to a neutral terminal and the second winding layer having a second termination electrically connected to the motor terminal wherein the stator winding is wound around the radial member of each pole such that the first termination is positioned substantially in an intersection of the radial member and the stator body so that the first termination is closer to the radial member than the second termination whereby a ground current associated with the second termination and EMI caused by such ground current is reduced as compared to the ground current occurring if the second termination is connected to the neutral terminal and the first termination is connected to the motor terminal.

18. The motor of claim 17 wherein the switching power converter comprises at least one solid-state switch.

19. The motor of claim 18 wherein the at least one solid-state switch comprises a IGBT.

20. The motor of claim 18 wherein the at least one solid-state switch comprises an MOSFET.

21. The motor of claim 17 wherein said rotor has an axis of rotation and wherein the radial member of each pole extends radially from the stator body relative to the axis of rotation of the rotor, each said pole further having a transverse member being positioned substantially perpendicular to the radial member.

22. The motor of claim 21 wherein the stator body, radial member, and transverse member define a winding space, the stator winding layers being positioned around the radial member in the winding space and wherein the stator winding comprises a salient pole winding.

23. The motor of claim 17 wherein the stator winding and the switching power converter comprise a multiphase motor.

24. The motor of claim 17 wherein a distance between the first winding layer and the second winding layer defines the width of the stator winding, said width being such that EMI is reduced at frequencies greater than 9 MHz.

25. A method of assembling a motor having a motor winding, a stator core having a stator body and a plurality of poles, each said pole having a radial member supported by the stator body, a switching power converter having power switches between which a motor terminal is defined, said switching power converter adapted to be connected to a power source for supplying power to the motor, and a rotor in magnetic coupling relation to the stator core, said method comprising the steps of:

winding the motor winding on at least a selected one of the radial members of the poles of the stator in layers so that one end of the winding is separated from the selected radial member by one or more layers of the winding, said winding being wound around the radial member of each pole such that the other end is positioned substantially in an intersection of the radial member and the stator body; and connecting the one end of the winding to the motor terminal of the switching power converter and connecting the other end to a neutral terminal to minimize ground currents associated with the other end of the winding and to minimize EMI caused by such ground currents whereby the other end is closer to the radial member than the one end.

* * * * *